Feb. 28, 1967  N. R. LYKES  3,306,499

POWDER DISTRIBUTOR

Filed May 6, 1965

INVENTOR.
Norman R Lykes
BY Scott L. Norviel
Atty.

United States Patent Office 3,306,499
Patented Feb. 28, 1967

3,306,499
POWDER DISTRIBUTOR
Norman R. Lykes, 12001 N. Ranch Lane,
Scottsdale, Ariz. 85034
Filed May 6, 1965, Ser. No. 453,800
3 Claims. (Cl. 222—193)

This invention concerns a powder applicator spreader, and pertains particularly to spreaders or dusters for powder insecticides or the like.

It has been observed of late that powder insecticides are effective in many cases where liquid sprays cannot be used. It is also known that certain powders which are nontoxic may be used as insecticides for the reason that the powders, due to the shape of their individual granules are effective in ridding a premises of insects and or entirely destroying the insects by mechanical means rather than by poisons. One of the substances which is very effective for displacing or destroying insects is diatomaceous earth. This substance is found in nature and consists of the fossilized remains of diatoms. This substance including particles of calcium carbonate in plated crystallized form and/or amorphous form including crystalline plates, sharp crystals which cling to the body and/or legs of insects work into the joints of the legs, etc., and irritate the insects to the point of exhaustion or even death. It is therefore advantageous to spray or distribute the powdered substance upon plant life which is to be protected from insects. One of the objects of the present invention is to provide the spray nozzle or distribution head for the powdered diatomaceous earth which will distribute the powder evenly and which will not clog up or cake. It is known that the substance here concerned has a tendency to compact or cake when handled in the small cartons or containers. When caking occurs, distribution of the substance in a uniform manner, as desired, cannot be made. Caking is one of the chief objections to the use of the substance as an insecticide, either when applied by hand or by a machine that will distribute and scatter the diatomaceous earth.

The preparation of the diatomaceous earth is comparatively simple, after mining, it must be finely ground and kept dry and not allowed to compact. The ground dried powder, diatomaceous earth, to be useful for the purposes here concerned, must be dry and mobile so that it will flow in the container from one point to another and at the same time can be removed by shaking or other light movement and will then flow or shake out and scatter in a uniform manner.

Another object of the invention is to provide a container which has the nozzle or spout through which air may be blown at the same time that the powder is shaken out through it.

This invention includes a pliable container having a nozzle which will release or mechanically distribute diatomaceous earth powder which will be carried by an air stream within the container until it forms a cloud of dust which can be easily applied to the substances needing treatment. To accomplish the foregoing objects I have provided the device shown in the accompanying drawings in which.

Similar numerals refer to similar parts in the several views.

Figure 1:
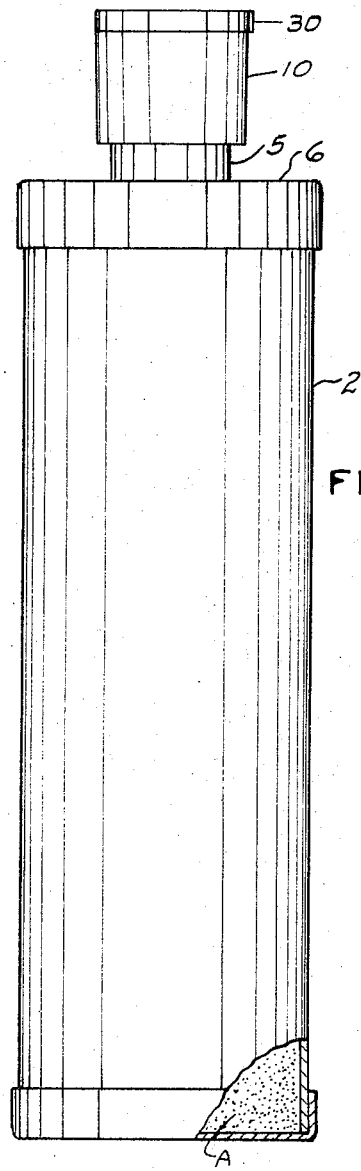
FIGURE 1 is a side elevational view of the device as applied to a distributing nozzle of a collapsible plastic container.
Figure 2:
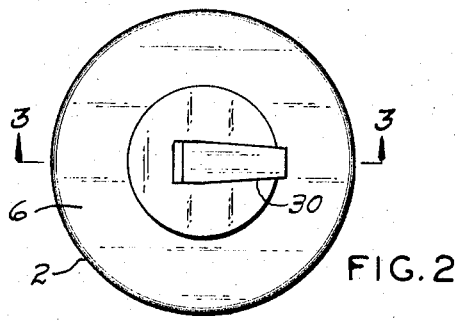
FIGURE 2 is a top view thereof.

In the drawings 2 indicates the container of flexible plastic material having comparatively thin walls 3 and being collapsible under pressure. Devices of this kind are well-known to the market and are used where it is desired to have them force out air at the same time some fluid or other substance is also extruded.

5 indicates a nozzle extending centrally from the top closure 6. This nozzle has an axial opening 7 through which substances in the container may be forced out or extruded.

A cap 10 is used to close this nozzle and may be retained on the outside of the nozzle by either screw threads 11 or by compression.

Figure 3:
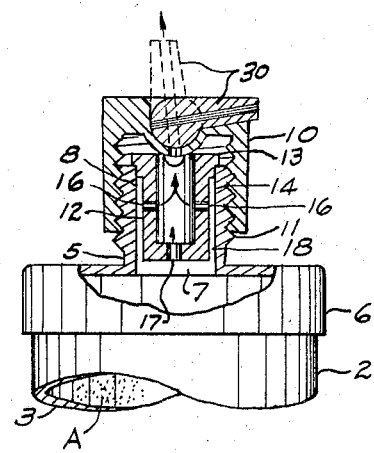
FIGURE 3 is a side sectional view of the device shown in FIGURE 2, with the section taken substantially on line 3—3.
Figure 4:
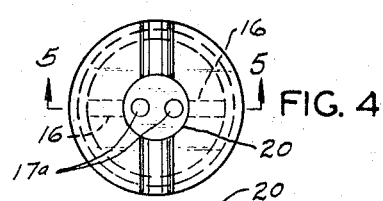
FIGURE 4 is a plan view of a shake out plug.
Figure 5:
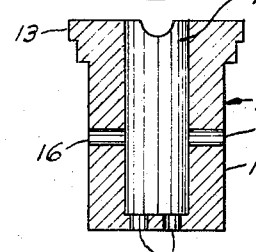
FIGURE 5 is a vertical section thereof taken on line 5—5 in FIGURE 4.

Removably fitted within the nozzle 8 there is a cylindrical distribution and mixing plug 12. This has a rim 13 at the top and with reduced diameter below the rim and extends far enough into the throat 14 of the nozzle to readily convey powdered substances forced out from the container. In the bottom of this cylindrical mixing plug, there is a hole as shown in FIGURE 3 or a plurality of openings, 17a, issuing from the interior of the container when it is squeezed.

In addition to this opening there are several radial openings 16 (small holes) in the sides 15 of the mixer, these small holes admit air into the mixer plug at the same time air is admitted from bottom openings 17a. When the side walls of the container 2 are squeezed together or partially collapsed, air is forced out through the holes, 16 and 17, above mentioned, at the same time powder and air are extruded or blown out from the larger axial hole 20 in the outer end of the mixer. The result is that the powder substance "A" and air issue from the outer hole 20, as a cloud.

The action of the radial openings 16, as air is blown through them is to keep the powdered substance A moving and keep it loose and mobile. This is just the opposite to caking that will otherwise occur if the powder accumulates in the annular area between the inside of the main nozzle opening and the outside of the mixer surface.

It is to be understood that air flows slowly upward through this annular area and with greater velocity through the openings in the bottom and walls of the mixer body.

The result of this structure the powder substance, such as diatomaceous earth or the like, placed in the container will not pack in the nozzle but will stay in a mobile condition.

In use the powder substance issues as a fog of dust from the opening in the end of the mixer.

When not in use this opening too may be closed by a valve 30 or any other device attached to the body of the cap.

The action of the device is two fold. First, the powder is kept in a loose condition and introduced in small quantities into the annular area 18. Second, air in large volume as compared to the powder extruded, is blown through the mixer which picks up and distributes and scatters the powder, on objects toward which the nozzle is pointed. Caking is in this way avoided.

I claim:

1. A powder scatterer comprising a cylindrical powder container of resiliently flexible plastic material to cause dispensing, said container closed at the bottom and at the top, a nozzle axially positioned on said top of said container and having an axial opening extending thru said nozzle, a nozzle plug having an axial opening therethrough and having an annular rim engaging the outer end of said nozzle surrounding said nozzle axial opening at its top and a midsection of reduced diameter below said rim forming an annulus area within said nozzle body, said plug having a plurality of radial holes in the body thereof connecting said annulus area with said axial opening in said plug to admit air to pass from said annulus area in said nozzle and into said axial opening of said plug via said radial holes and prevent caking of said powder.

2. A powder scatterer comprising a cylindrical powder container of resiliently flexible plastic material to cause dispensing, said container closed at the bottom and at the top, a hollow nozzle centrally positioned and axially disposed on the top of said closure and having an axial bore to extrude air and powder therethrough, an annular portion at the top thereof, a nozzle plug having an axial bore and an annular rim at its top, said rim fitted against said annular portion and a shank there below of reduced diameter to form an annular open space between the walls of said axial bore of said nozzle and the outside of said plug, said plug having radial holes therein connecting said annular open space with the axial bore in said plug, and valve means for closing the axial bore in said plug.

3. A powder scatterer comprising a cylindrical powder container of resiliently flexible plastic material to cause dispensing, said container closed at the bottom and at the top, a hollow nozzle centrally positioned and axially disposed on the top of said container and having an axial bore to extrude air and powder therethrough; said nozzle having annular portion at the top thereof, a nozzle plug having an axial bore and an annular rim at its top, said rim fitted against said annular portion and a shank there below of reduced diameter to form an annular open space between the walls of said axial bore of said nozzle and the outside of said plug, said plug having radial holes therein connecting said annular open space with the axial bore in said plug, to form an air current and prevent packing of powdered material in said axial bore of said plug.

References Cited by the Examiner
UNITED STATES PATENTS

| | | | |
|---|---|---|---|
| 2,577,321 | 12/1951 | Filger | 239—327 X |
| 2,840,277 | 6/1958 | Bach | 222—193 |
| 2,924,393 | 2/1960 | Robert | 239—327 |
| 2,979,238 | 4/1961 | Bramming | 222—536 X |
| 2,987,261 | 6/1961 | McCuiston et al. | 239—327 X |
| 3,111,245 | 11/1963 | Libit et al. | 222—534 |
| 3,176,883 | 4/1965 | Davis | 222—193 |
| 3,185,352 | 5/1965 | Ghisolfi | 222—193 |

FOREIGN PATENTS 196,424  6/1938  Switzerland.

OTHER REFERENCES

Hagen et al.: German application 1,059,363, printed June 1959 (3 pp. spec., 1 sh. dwg.).

RAPHAEL M. LUPO, *Primary Examiner.*